United States Patent [19]

Tsuda et al.

[11] Patent Number: 4,877,835

[45] Date of Patent: Oct. 31, 1989

[54] THERMOPLASTIC RESIN COMPOSITION

[75] Inventors: Yusuke Tsuda; Takashi Kurata; Yoshinobu Suzuki; Yuji Yamamoto, all of Tokyo, Japan

[73] Assignee: Japan Synthetic Rubber Co., Ltd., Tokyo, Japan

[21] Appl. No.: 241,459

[22] Filed: Sep. 8, 1988

[30] Foreign Application Priority Data

Oct. 2, 1987 [JP] Japan ................................. 62-249473

[51] Int. Cl.$^4$ .............................................. C08L 69/00
[52] U.S. Cl. ........................................ 525/67; 525/69; 525/439
[58] Field of Search ...................... 525/67, 146, 68, 69, 525/439

[56] References Cited

U.S. PATENT DOCUMENTS 3,644,574 2/1972 Jackson et al. ...................... 525/165
4,780,506 10/1988 Wefer ..................................... 525/67

FOREIGN PATENT DOCUMENTS 1595039 8/1981 United Kingdom .

Primary Examiner—Theodore E. Pertilla
Attorney, Agent, or Firm—Oblon, Spivak, McClelland, Maier & Neustadt

[57] ABSTRACT

A thermoplastic resin composition with superior chemical resistance and impact resistance is disclosed. The composition comprises: 50 to 90% by weight of a rubber-modified styrene thermoplastic resin containing 10 to 60% by weight of α-methyl styrene, 5 to 48% by weight of an aromatic polyester, and 2 to 10% by weight of an aromatic polycarbonate.

8 Claims, No Drawings

THERMOPLASTIC RESIN COMPOSITION

BACKGROUND OF THE INVENTION

1. Field of the Invention

This invention relates to a thermoplastic resin composition having superior chemical resistance and impact resistance, and, in particular, to a thermoplastic resin composition with superior chemical resistance and impact resistance, to which an aromatic polyester and an aromatic polycarbonate are compounded, and in which a thermoplastic resin containing α-methyl styrene is used.

2. Description of the Background

Conventionally, aromatic vinyl thermoplastic resins, rubber-modified styrene thermoplastic resins, in particular, have widely been used in a variety of fields for automobile parts, electric appliances, and the like, because they are light in weight and have superior moldability.

However, rubber-modified styrene thermoplastic resins are not always stable against organic solvents or the like. Moreover, their chemical resistances are sometimes significantly impaired when a stress is involved or when the article is used in deformed conditions. These present a big problem when one contemplates to use a rubber-modified styrene thermoplastic resin for diversified applications.

Especially, when the resin is used as an automobile part which may contact with a polyvinyl chloride resin to which a plasticizer is compounded or when break fluid sticks to the rubber-modified styrene thermoplastic resin part, the resin develops so-called environmental stress crack.

In order to overcome these problems, attempts have been undertaken such as to increase the molecular weight of a rubber-modified styrene thermoplastic resin or to introduce a vinylcyano compound or a monomer having a polar group such as (meth)acrylic acid ester into the resin polymer. These attempts, however, are not successful in providing sufficient chemical resistance to rubber-modified styrene thermoplastic resins.

Furthermore, rubber-modified styrene thermoplastic resins do not possess sufficient impact resistance, and therefore their fields of application have been limited in this respect.

The inventors have undertaken extensive studies in order to resolve these problems in rubber-modified styrene thermoplastic resins, and found that a resin having remarkably improved chemical resistance and impact resistance can be obtained by using a rubber-modified styrene thermoplastic resin to which specific amounts of α-methyl styrene is copolymerized and by compounding a specific amount of aromatic polyester and aromatic polycarbonate into this rubber-modified styrene thermoplastic resin. The finding has led to the completion of this invention.

SUMMARY OF THE INVENTION

Accordingly, an object of this invention is to provide a thermoplastic resin composition comprising:
(A) 50 to 90% by weight of a rubber-modified styrene thermoplastic resin,
(B) 5 to 48 % by weight of an aromatic polyester, and
(C) 2 to 10% by weight of an aromatic polycarbonate; wherein 10 to 60% by weight of α-methyl styrene is copolymerized in said rubber-modified styrene thermoplastic resin.

Other and further objects, features and advantages of the invention will appear more fully from the following description.

DETAILED DESCRIPTION OF THE INVENTION AND PREFERRED EMBODIMENTS

Components (A) to (C) used in the thermoplastic resin composition of this invention is now described in detail.

(A) Rubber-modified styrene thermoplastic resin

The (A) component used in the composition of this invention is either (1) a rubber-modified styrene polymer or (2) a mixture of a rubber-modified styrene polymer and a styrene polymer (which is not rubber-modified), and they are prepared by incorporating a rubber-type polymer into a specific type of styrene polymer in order to provide the latter with high impact resistance. The incorporation of a rubber-type polymer can be performed through a simple mechanical blending of the mixture. The use of a graft copolymer is desirable in order to provide a better mutual solubility of the components. Such a 9raft copolymer is prepared by graft-copolymerizing a rubber-type polymer with an aromatic vinyl compound, or with a mixture of an aromatic vinyl compound and other type of vinyl compound. The product produced by graft-blending method can also be used, in which a graft-polymerized rubber-modified styrene polymer is blended with a styrene-containing polymer which is separately prepared.

Rubber-type polymers which can be used in this invention include polybutadiene, styrene-butadiene copolymer, acryl-type copolymer, ethylene-propylene copolymer, chlorinated polyethylene, polyurethane, and the like. Among these, an especially preferable rubber-type polymer is polybutadiene.

Given as examples of aromatic vinyl compounds are styrene, α-methyl styrene, bromo-styrene, p-methyl styrene, and the like. Among these α-methyl styrene is an essential compound for the composition of the present invention, and should be contained in an amount of from 10 to 60% by weight, and preferably from 12 to 50% by weight, in the rubber-modified styrene thermoplastic resin.

When the content of α-methyl styrene is less than 10% by weight, although the final composition, to which (B) and (C) components; aromatic polyester and aromatic polycarbonate, have been compounded, exhibits excellent chemical resistance, its impact resistance is insufficient. With the amount of α-methyl styrene exceeding 60% by weight the molding workability (or fluidity) of the final composition is impaired. Also, since α-methyl styrene does not have good polymerizing capability, use of this compound in excess of 60% by weight will result in a polymerization conversion loss, and thus is undesirable.

Styrene is given as an example of the aromatic vinyl compound other than α-methyl styrene.

Copolymerizable monomers other than aromatic vinyl compounds include cyanized vinyl compounds such as acrylonitrile and methacrylonitrile; methylmethacrylate, N-phenylmaleimide, N-cyclohexylmaleimide, maleic anhydride, methacrylic acid, and the like.

Since impact resistance, in general, is promoted only insufficiently by mere copolymerization of an aromatic vinyl compound with a rubber-modified styrene thermoplastic resin, copolymerization of a cyanized vinyl compound is more preferable. In this instance, a preferable proportion of the aromatic vinyl compound and the cyanized vinyl compound, in terms of % by weight, is in the range of 60 – 90/10 – 40, with particularly preferable range being 65 – 85/15 – 35.

Specific examples of the rubber-modified styrene thermoplastic resins may be those conventional styrene-type resins in which all or portion of styrene is substituted with α-methyl styrene. Such conventional styrene resins include acrylonitrile-butadiene-styrene resin (ABS resin), acrylonitrile-ethylenepropylene-styrene resin (AES resin), methylmethacrylate-butadiene-styrene resin (MBS resin), acrylonitrile-butadiene-methyl-methacrylate-styrene resin (transparent ABS resin), rubber-modified polystyrene (high-impact polystyrene: HIPS), and the like. It is essential for the composition of this invention that α-methyl styrene be contained in an amount of 10 – 60% by weight in these resins. A particularly preferable resin is heat resistant ABS resin copolymerized with α-methyl styrene.

The content of rubber in the rubber-modified styrene thermoplastic resin is preferably 5 – 40% by weight, and particularly preferably 10 – 30% by weight.

It is desirable that the methyl ethyl ketone soluble component in the rubber-modified styrene thermoplastic resin has an intrinsic viscosity ([η]30.c/MEX, unit: dl/g) measured in methyl ethyl ketone at 30.C is in the range of 0.2 to 1.2, and preferably 0.3 to 1.0.

The rubber component graft ratio of the graft polymer in the rubber-modified styrene thermoplastic resin measured by solvent fractionation using acetone or the like is preferably 10 – 150%, and particularly preferably 20 – 100%.

(B) Aromatic polyester

Given as examples of aromatic polyesters are, beside condensation products of p-hydroxybenzoic acid, those compounds produced by condensation of an aromatic dicarboxylic acid or its ester-forming derivative and a diol compound.

Aromatic dicarboxylic acids used in the preparation of the aromatic polyester include, for example, naphthalene dicarboxylic acids such as naphthalene-2,6-dicarboxylic acid, and terephthalic acid, isophthalic acid, adipic acid, sebasic acid, as well as their ester-forming derivatives.

Examples of diols include polymethylene glycol having 2 – 6 carbon atoms such as ethylene glycol, 1,4-butanediol, and 1,6-hexanediol, and 1,4-cyclohexanediol, bisphenol A, and the like, as well as their ester-forming derivatives.

Given as specific examples of aromatic polyesters thus prepared are polyethylene terephthalate (PET), polybutylene terephthalate (PBT), bisphenol A isophthalate, and the like. Among these, polybutylene terephthalate (PBT) is a preferable aromatic polyester.

Desirable intrinsic viscosity of these aromatic polyesters in a mixed solvent of tertachloroethane/phenol (1/1) at 25° C ([η]30.c/tetachloroethane/phenol, unit: dl/g) is in the range of 0.4 – 2.0, with especially desirable range being 0.6 – 1.5.

(C) Aromatic polycarbonate

As aromatic polycarbonates which may be used in the rubber-modified styrene thermoplastic resin composition of this invention, 4,4,-dihydroxydiphenylalkane-type polycarbonates are particularly preferable. More particularly, preferable polycarbonates are those prepared by ester exchange or phosgene method using 2,2-(4,4,-dihydroxydiphenyl)-propane (hereinafter referred to as "bisphenol A"), as a dihydroxyl component. Compounds prepared by substituting a part or whole of bisphenol A with other types of 4,4,-dihydroxydiphenylalkane or 4,4,-dihydroxydiphenylether are also preferable.

Among these aromatic polycarbonates, those having weight average molecular weight ($M_w$) measured by photodiffusion method of 10,000 to 80,000 are preferable, with a particularly preferable $M_w$ being 10,000 to 50,000.

The rubber-modified styrene thermoplastic resin composition of this invention is prepared by blending or mixing (A) rubber-modified styrene thermoplastic resin, (B) aromatic polyester, and (C) aromatic polycarbonate. The method for the preparation of this resin is now discussed in more detail.

Composition

The rubber-modified styrene thermoplastic resin is compounded in an amount of 50 to 90 % by weight, preferably 57 to 87% by weight into the composition. When this amount is less than 50% by weight, the impact resistance of the resin prepared is impaired. The amount exceeding 90% by weight is not desirable because the resulting composition has decreased chemical resistance.

The aromatic polyester is compounded in an amount of 5 to 48% by weight, preferably 10 to 40% by weight into the composition. If this amount is less than 5% by weight, the resulting composition has only poor chemical resistance, while, on the other hand, if the amount exceeds 48% by weight, the impact resistance is damaged.

The aromatic polycarbonate is compounded in an amount of 2 to 10% by weight, preferably 3 to 8% by weight, into the composition. If this amount is less than 2% by weight, the resulting composition has only poor impact resistance, while, on the other hand, if the amount exceeds 10% by weight, the chemical resistance is damaged.

Blending

Various methods as well as various blending machines conventionally used in the blending or mixing of thermoplastic resins can be employed for blending and mixing the rubber-modified styrene thermoplastic resin, aromatic polyester, and aromatic polycarbonate. Such blending machines include, for example, Banbury mixer, Brabender, Plasto-mill, a kneader, or an extruder with a vent. Among these, the use of an extruder with a vent is especially desirable.

There are no specific limitations to the form of the resins before the blending and mixing. Any of the forms, including pellets, beads, powder, flake, or the like are acceptable. The blending temperature should be higher than the melting point of the aromatic polyester to be blended. However, since the rubber-modified styrene thermoplastic resin is thermally unstable at a temperature above 300° C, the blending temperature of between 230 and 300° C is desirable.

The preparation of the rubber-modified styrene thermoplastic resin by graft-blending method has an advantage in that it makes possible the blending of the 4 components, i.e., graft polymer, styrene-type polymer, aromatic polyester, and aromatic polycarbonate, at the same time.

The thermoplastic resin of this invention prepared according to the method fully described above, exhibits remarkably superior chemical resistance and impact resistance, and, at the same time, possesses excellent characteristics with respect to moldability, outward appearance of the formed articles, and the like, which are inherent to a rubber-modified styrene thermoplastic resin.

One feature characteristic to the thermoplastic resin of the present invention resides in that an aromatic polyester and an aromatic polycarbonate are compounded into a rubber-modified styrene thermoplastic resin containing $\alpha$-methyl styrene.

Here, the function of the aromatic polyester is considered as follows. The incorporation of an aromatic polyester which is a crystalline resin into a rubber-modified styrene thermoplastic resin which is a non-crystalline resin contributes to formation of a dense crystalline structure of the latter, which prevents chemicals from entering into the resin structure, thus promoting its chemical resistance.

The function of the aromatic polycarbonate is considered as follows. Formulating only an aromatic polyester into a rubber-modified styrene thermoplastic resin will promote its chemical resistance but impairs the impact resistance. This is presumed to be caused by incapability of the two resins to mix with each other. Incorporating a small amount of an aromatic polycarbonate into the two-resin system was found to offset the decrease in its impact resistance. Although the reason cannot be fully elucidated, it is well conceivable that an aromatic polycarbonate exerts some kind of action on the mutual mixing ability of a rubber-modified styrene thermoplastic resin and an aromatic polyester.

On the other hand, the action brought about by $\alpha$-methyl styrene is considered as follows. Even though the decrease in impact resistance of the resin composition of this invention can be suppressed to a certain extent by formulating an aromatic polycarbonate, the degree of the suppression provided by an aromatic polycarbonate is not sufficient. The inventors have found that a great improvement in the impact resistance resulted from copolymerization of a specific amount of $\alpha$-methyl styrene with a rubber-modified styrene thermoplastic resin. Copolymerizing $\alpha$-methyl styrene with a rubber-modified styrene thermoplastic resin impairs the impact resistance of the latter in general. However, as opposed to this general phenomenon, this copolymerization of $\alpha$-methyl styrene improves the impact resistance, when such the rubber-modified styrene thermoplastic resin is used together with an aromatic polyester and an aromatic polycarbonate. This effect brought about by $\alpha$-methyl styrene is considered as a result of the sophisticated actions of a steric hindrance effect and an electron discharging effect both characteristic to the $\alpha$-methyl group to blending property of the three-component system. Although the details of this phenomenon is still to be elucidated, the effect was quite out of expectation.

Other features of the invention will become apparent in the course of the following description of the exemplary embodiments which are given for illustration of the invention and are not intended to be limiting thereof.

EXAMPLE

In the examples below, all the designation of "part(s)" denotes "parts by weight".

Following thermoplastic resins were used in the examples:

(A) Rubber-modified styrene thermoplastic resin

ABS Resin 1: An ABS graft polymer obtained by graft polymerization of 40 parts of polybutadiene rubber 43 parts of styrene, and 17 parts of acrylonitrile, at a graft ratio of 50%. $[\eta]=0.5$ ABS Resin 2: An ABS graft polymer obtained by graft polymerization of 20 parts of polybutadiene rubber, 40 parts of styrene, 20 parts of $\alpha$-methyl styrene, and 20 parts of acrylonitrile, at a graft ratio of 40%. $[\eta]=0.45$ ABS Resin 3: An ABS graft polymer obtained by graft polymerization of 40 parts of polybutadiene rubber, 42 parts of $\alpha$-methyl styrene, and 18 parts of acrylonitrile, at a graft ratio of 45%. $[\eta]=0.5$ AS Resin: An AS resin composed of 75 parts of styrene, and 25 parts of acrylonitrile. $[\eta]=0.6$ Heat Resistant AS Resin: An $\alpha$-methyl styrene copolymer resin composed of 70 parts of $\alpha$-methyl styrene, 7 parts of styrene, and 23 parts of acrylonitrile. $[\eta]=0.4$ AES Resin: An AES resin composed of 30 parts of EPDM containing ethylidenenorbornene, 49 parts of styrene, and 21 parts of acrylonitrile, at a graft ratio of 50%. $[\eta]=0.5$ (B) Aromatic polyester PBT Resin: Duranex XD-499 (trade name) produced by Polyplastic Co., Ltd. $[\eta]=1.0$
PET Resin: $[\eta]=0.9$ (C) Aromatic polycarbonate PC Resin: A2200 (trade name) manufactured by Idemitsu Petrochemical Co., Ltd. $M_w=25,900$

EXAMPLES 1 - 12, COMPARATIVE EXAMPLES 1 - 8

Thermoplastic resins listed in Tables 1-1 and 1-2 were mixed at a proportion shown in the same tables using a Henschel mixer. The mixture was granulated using a 30 m/m two-axis extruder with a vent at 230 - 270° C. The granules were dried at 90.C and injection-molded at 230 - 270° C. The characteristics measured on the products are shown in Tables 1-1 and 1-2.

The measurement of various characteristics of the molded product were carried out according to the following methods:

Izod impact strength: ASTM D256 (6 mm thickness, with a notch)
Melt-flow rate: ASTM D1238 (240° C, 10 kg)
Load deflection temperature: ASTM D 648 (load 18.6 kg/cm$^2$, without anneal)
Gloss: ASTM D523 (3mm thickness)
Solvent crack at a constant strain: A constant strain at a strain ratio of 0.5% was applied to a test specimen ($\frac{1}{8}''\times 1/5''\times 5''$) and break oil (abbreviated to "BO") was applied onto the deflected portion. The time period from the application of the break fluid through breaking when the test specimen was left at a temperature of 23° C was measured. The same measurement was conducted using dioctylphthalate (abbreviated to "DOP")

at a strain ratio of 1.0%. The longer the time period until breaking, the higher the chemical resistance.

The target time periods preset were longer than 5 hours (5 - 6 minutes with a normal ABS) for BO and longer than 10 hours (5 - 6 hours with a normal ABS) for DOP.

products which are extremely excellent in both impact resistance as represented by Izod impact strength and chemical resistance represented by the solvent crack at a constant strain. The products are also excellent with respect to other characteristics, i.e., fluidity represented by the melt-flow rate, heat resistance represented by the

TABLE 1-1

| | Unit | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|
| Thermoplastic Resin Components | | | | | | | | | | | | | |
| (A) Rubber-modified Styrene | | | | | | | | | | | | | |
| ABS Resin 1 | parts by weight | 0 | 45 | 45 | 45 | 45 | 45 | 45 | 45 | 0 | 0 | 0 | 0 |
| ABS Resin 2 | " | 65 | 0 | 0 | 0 | 0 | 0 | 0 | 0 | 0 | 0 | 0 | 0 |
| ABS Resin 3 | " | 0 | 0 | 0 | 0 | 0 | 0 | 0 | 0 | 0 | 45 | 45 | 45 |
| AS Resin | " | 0 | 0 | 10 | 0 | 23 | 0 | 0 | 0 | 0 | 20 | 10 | 0 |
| Heat Resistant AS Resin | " | 0 | 20 | 10 | 10 | 20 | 20 | 20 | 20 | 20 | 0 | 10 | 20 |
| AES Resin | " | 0 | 0 | 0 | 0 | 0 | 0 | 0 | 0 | 60 | 0 | 0 | 0 |
| (B) Aromatic Polyester | | | | | | | | | | | | | |
| PBT Resin | " | 30 | 30 | 30 | 40 | 7 | 32 | 27 | 0 | 17 | 30 | 30 | 30 |
| PET Resin | " | 0 | 0 | 0 | 0 | 0 | 0 | 0 | 30 | 0 | 0 | 0 | 0 |
| (C) Aromatic Polycarbonate | | | | | | | | | | | | | |
| PC Resin | " | 5 | 5 | 5 | 5 | 5 | 3 | 8 | 5 | 3 | 5 | 5 | 5 |
| Proportion | | | | | | | | | | | | | |
| (A) Rubber-modified Styrene Thermoplastic Resin | weight % | 65 | 65 | 65 | 55 | 88 | 65 | 65 | 65 | 80 | 65 | 65 | 65 |
| (B) Aromatic Polyester | " | 30 | 30 | 30 | 40 | 7 | 32 | 27 | 30 | 17 | 30 | 30 | 30 |
| (C) Aromatic Polycarbonate | " | 5 | 5 | 5 | 5 | 5 | 3 | 8 | 5 | 3 | 5 | 5 | 5 |
| Content of α-methyl styrene in (A) | " | 20 | 21.5 | 10.8 | 12.7 | 15.9 | 21.5 | 21.5 | 21.5 | 17.5 | 29.1 | 39.8 | 50.6 |
| Characteristics | | | | | | | | | | | | | |
| Izod Impact Strength | Kg·cm/cm | 55 | 65 | 40 | 34 | 44 | 53 | 65 | 53 | 39 | 58 | 50 | 45 |
| Melt-flow Rate | g/10 min | 22 | 24 | 27 | 38 | 26 | 26 | 23 | 47 | 30 | 28 | 22 | 17 |
| Load Deflection Tem. | °C. | 94 | 95 | 94 | 88 | 90 | 95 | 95 | 93 | 90 | 98 | 102 | 105 |
| Glossiness | % | 91 | 91 | 90 | 87 | 90 | 90 | 90 | 90 | 86 | 86 | 87 | 87 |
| Solvent Crack at Constant Strain (BO) | Hours | 48+ | 48+ | 48+ | 48+ | 6 | 48+ | 7 | 48+ | 48+ | 48+ | 48+ | 48+ |
| Solvent Crack at Constant Strain (DOP) | Hours | 48+ | 48+ | 48+ | 48+ | 11 | 48+ | 48+ | 48+ | 48+ | 48+ | 48+ | 48+ |

TABLE 1-2

| | Unit | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Thermoplastic Resin Components | | | | | | | | | |
| (A) Rubber-modified Styrene | | | | | | | | | |
| ABS Resin 1 | parts by weight | 45 | 45 | 45 | 45 | 45 | 35 | 45 | 45 |
| ABS Resin 2 | " | 0 | 0 | 0 | 0 | 0 | 0 | 0 | 0 |
| ABS Resin 3 | " | 0 | 0 | 0 | 0 | 0 | 0 | 0 | 0 |
| AS Resin | " | 55 | 25 | 20 | 12 | 26 | 0 | 0 | 0 |
| Heat Resistant AS Resin | " | 0 | 0 | 0 | 8 | 20 | 10 | 20 | 20 |
| AES Resin | " | 0 | 0 | 0 | 0 | 0 | 0 | 0 | 0 |
| (B) Aromatic Polyester | | | | | | | | | |
| PBT Resin | " | 0 | 30 | 30 | 30 | 4 | 50 | 34 | 23 |
| PET Resin | " | 0 | 0 | 0 | 0 | 0 | 0 | 0 | 0 |
| (C) Aromatic Polycarbonate | | | | | | | | | |
| PC Resin | " | 0 | 0 | 5 | 5 | 5 | 5 | 1 | 12 |
| Proportion | | | | | | | | | |
| (A) Rubber-modified Styrene Thermoplastic Resin | weight % | 100 | 70 | 65 | 65 | 91 | 45 | 65 | 65 |
| (B) Aromatic Polyester | " | 0 | 30 | 30 | 30 | 4 | 50 | 34 | 23 |
| (C) Aromatic Polycarbonate | " | 0 | 0 | 5 | 5 | 5 | 5 | 1 | 12 |
| Content of α-methyl styrene in (A) | " | 0 | 0 | 0 | 8.6 | 15.4 | 15.6 | 21.5 | 21.5 |
| Characteristics | | | | | | | | | |
| Izod Impact Strength | Kg·cm/cm | 25 | 12 | 20 | 26 | 35 | 19 | 26 | 62 |
| Melt-flow Rate | g/10 min | 28 | 25 | 23 | 22 | 28 | 38 | 27 | 23 |
| Load Deflection Tem. | °C. | 92 | 91 | 91 | 93 | 95 | 83 | 94 | 95 |
| Glossiness | % | 84 | 87 | 88 | 90 | 87 | 85 | 86 | 89 |
| Solvent Crack at Constant Strain (BO) | Hours | 1— | 48+ | 48+ | 48+ | 1 | 48+ | 48+ | 3 |
| Solvent Crack at Constant Strain (DOP) | Hours | 3 | 48+ | 48+ | 48+ | 4 | 48+ | 48+ | 24 |

As demonstrated by Examples 1 - 12, the compositions of the present invention provide molded resin load deflection temperature, and outward appearance represented by glossiness.

The rubber-modified styrene thermoplastic resin composition using a conventional ABS resin of Comparative Example 1 exhibited bad chemical resistance. The impact resistance represented by Izod impact strength of this resin composition was also inferior to the composition of the present invention.

The composition of Comparative Example 2, into which only an aromatic polyester was compounded, although exhibited remarkable chemical resistance, its impact resistance was poor, indicating that the composition is undesirable.

The composition of Comparative Example 3, into which both an aromatic polyester and an aromatic polycarbonate were compounded, demonstrated suppression in the decrease in impact resistance but only to an insufficient extent. As evident from the comparison of this composition with that of Example 2, the effect of improved impact resistance is attained only through incorporation of α-methyl styrene.

The composition of Comparative Example 4 contains α-methyl styrene but in an amount less than that required according to this invention. It is evident from this Comparative Example that the use of α-methyl styrene at less than 10% by weight is not sufficient for the resin to exhibit improvement in impact resistance of the degree aimed at in this invention.

The resin compositions given in Comparative Examples 5 and 6 are those with rubber-modified styrene thermoplastic resin and aromatic polyester formulation, of which percentages are different from those defined in this invention. As evident from Comparative Example 5, a composition to which more than 90% of rubber-modified styrene thermoplastic resin and less than 5% of aromatic polyester are compounded has a lowered chemical resistance. While, on the other hand, Comparative Example 6 shows that the composition containing less than 50% of rubber-modified styrene thermoplastic resin and more than 48% of aromatic polyester possesses a poor impact resistance.

The compositions of Comparative Examples 7 and 8 are those with an aromatic polycarbonate content outside the range defined in this invention. These examples demonstrate that the amount of the aromatic polycarbonate at less than 2% by weight impairs impact resistance (Comparative Examples 7) and more than 10 % by weight affects chemical resistance (Comparative Examples 8).

In the rubber-modified styrnne thermoplastic resin composition according to the present invention, a great deal of improvement in impact resistance is achieved through incorporation of a specific amount of α-methyl styrene. This is unexpected effect of the composition, which is against the general concept that the use of α-methyl styrene as a monomer component in graft copolymerization decreases the impact resistance of the resulting resin.

Since the thermoplastic resin composition of the present invention has outstanding impact resistance along with superior chemical resistance, the resin provides a great deal of potentiality of new applications and has a great industrial value.

Obviously, numerous modifications and variations of the present invention are possible in light of the above teachings. It is therefore to be understood that the scope of the appended claims, the invention may be practiced otherwise than as specifically described herein.

What Is claimed As New And Desired To Be Secured By Letters Patent:

1. A thermoplastic resin composition comprising:
   (A) 50 to 90% by weight of a rubber-modified styrene thermoplastic resin,
   (B) 5 to 48 % by weight of an aromatic polyester, and
   (C) 2 to 10% by weight of an aromatic polycarbonate;

wherein 10 to 60% by weight of α-methyl styrene is copolymerized in said rubber-modified styrene thermoplastic resin.

2. The thermoplastic resin composition according to claim 1, wherein said rubber-modified styrene thermoplastic resin is a graft copolymer prepared from a rubber-type polymer and an aromatic vinyl compound.

3. The thermoplastic resin composition according to claim 2, wherein said rubber-type polymer is one or more polymers selected from polybutadiene, styrene-butadiene copolymer, acryl-type copolymer, ethylene-propylene copolymer, chlorinated polyethylene, and polyurethane, and said aromatic vinyl compound is one or more compounds selected from styrene, α-methyl styrene, bromo-styrene, and p-methyl styrene.

4. The thermoplastic resin composition according to claim 1, wherein said rubber-modified styrene thermoplastic resin is one or more resins selected from the group consisting of acrylonitrile-butadiene-styrene resin (ABS resin), acrylonitrile-ethylenepropylene-styrene resin (AES resin), methylmethacrylate-butadiene-styrene resin (MBS resin), acrylonitrile-butadiene-methylmethacrylate-styrene resin (transparent ABS resin), and rubber-modified polystyrene (high-impact polystyrene: HIPS), each containing 10 – 60% by weight of α-methyl styrene.

5. The thermoplastic resin composition according to claim 1, 2, 3, or 4, wherein the content of α-methyl styrene in said rubber-modified styrene thermoplastic resin is 12 – 50% by weight.

6. The thermoplastic resin composition according to claim 1, wherein said aromatic polyester is one or more aromatic polyesters prepared by the poly-condensation reaction of a dicarboxylic acid or its ester-forming derivative and diol.

7. The thermoplastic resin composition according to claim 1, wherein said aromatic polyester is one or more polymers selected from polyethylene terephthalate (PET), polybutylene terephthalate (PBT), and bisphenol A isophthalate.

8. The thermoplastic resin composition according to claim 1, wherein said aromatic polycarbonate is one or more 4,4,'-dihydroxydiphenylalkane-type polycarbonates derived from bisphenol A.

* * * * *